United States Patent Office 3,518,337
Patented June 30, 1970

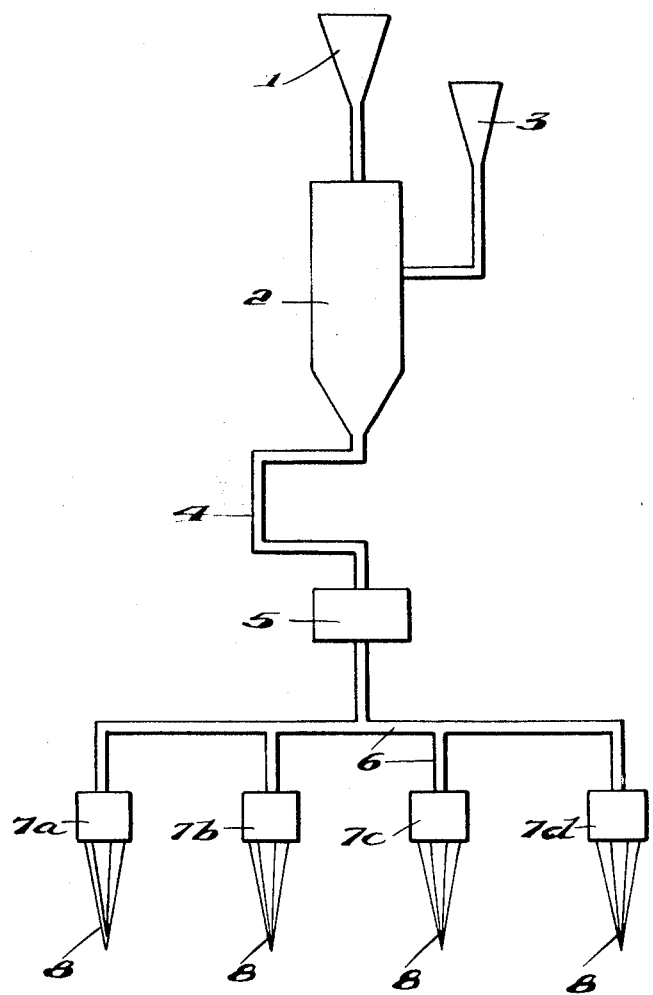

3,518,337
PROCESS FOR DISPERSING PARTIALLY MISCIBLE POLYMERS IN MELT SPINNABLE FIBER-FORMING POLYMERS
Jesús Nicolás, Wilmington, Del., assignor to E. I. du Pont de Nemours and Company, Wilmington, Del., a corporation of Delaware
Filed Sept. 14, 1967, Ser. No. 667,787
Int. Cl. B29f 3/10
U.S. Cl. 264—176                                6 Claims

ABSTRACT OF THE DISCLOSURE

A process to improve uniformity of filaments of synthetic, fiber-forming polymers having dispersed therein discrete particles of a partially miscible, substantially inert polymer. Process encompasses saturating the fiber-forming polymer melt with the partially miscible polymer prior to further injection of the latter during the melt-spinning operation.

---

This invention concerns an improved process for melt-spinning filaments of a synthetic, linear, fiber-forming polymer having dispersed therein a partially miscible, substantially inert polymer.

Properties of filaments of synthetic, linear, fiber-forming polymers can be modified for specific end-uses by dispersing in the polymer prior to spinning another polymer which is substantially incompatible and non-reactive with the fiber-forming polymer and remains dispersed therein as discrete particles. Such filaments and their preparation are described for example in British Pat. 963,320. The modifying polymer may be dispersed in the fiber-forming polymer either by introduction into the polymerization reaction mixture or by dispersion in the molten fiber-forming polymer after polymerization but prior to melt-spinning. The latter procedure is usually preferred when the modifying polymer has limited stability under the polymerization or melt-spinning conditions.

To produce such filaments having consistently uniform properties it is essential that the concentration and particle size of the dispersed polymer do not fluctuate appreciably throughout the melt-spinning process. For example, when passing the molten polymer mixture through a transfer line to multiple spinning positions an unstable or improperly mixed polymer dispersion can result in variations in composition from position to position even though they are fed from a single polymer source. This problem is particularly acute when the modifying polymer is injected and dispersed in the fiber-forming polymer continuously just prior to the melt-spinning process and the modifying polymer is partially miscible with the polymer into which it is dispersed.

This invention is the improvement in the process of dispersing a partially miscible, substantially inert, molten polymer in a molten, synthetic, linear, fiber-forming polymer and continuously melt-spinning the polymer mixture into filaments which comprises substantially saturating said fiber-forming polymer melt with said partially miscible polymer prior to further injection of the latter during the melt-spinning process. Consequently, substantially all of the said partially miscible polymer dispersed during the melt-spinning operation remains dispersed as a separate polymer phase.

"Partially miscible" as used herein means that the dispersed polymer is slightly soluble in the fiber-forming polymer under the melt-spinning conditions but a major portion of said partially miscible polymer remains dispersed as a separate polymer phase in discrete particles.

By "substantially inert" is meant that the partially miscible polymer remains substantially free from chemical interaction or thermal degradation.

"Substantially saturated" means that further addition of said partially miscible polymer results in the appearance of discrete particles of a separate polymer phase which remain as such throughout the remainder of the process.

By "continuously melt-spinning" is meant that after the partially miscible, inert, polymer is dispersed in the previously saturated fiber-forming polymer the resulting polymer dispersion is continuously fed to the spinning positions while constantly being maintained in a molten condition.

The details of the invention will be more easily understood by reference to the following description and the accompanying figure in which the apparatus involved in the process of this invention is schematically shown.

Referring to the figure, a melt-spinnable synthetic, linear, fiber-forming polymer substantially saturated with the slightly or partially miscible, inert, polymer is fed from polymer supply 1 to the heated, polymer-mixing apparatus 2 having means for injecting the molten, slightly miscible inert polymer from polymer supply 3. The mixed polymer dispersion is then passed through transfer line 4 to a conventional melt-spinning meter pump 5 from which the polymer mixture is fed through transfer and manifold lines 6 through ports a, b, c and d to multiple spinning positions whereupon the polymer is forced through the conventional spinneret packs 7 and spun into filaments 8.

The fiber-forming polymer may be previously saturated with the partially miscible polymer by any suitable means. This is accomplished by introducing the partially miscible polymer in a sufficient concentration such that it becomes totally dissolved or miscible with the molten fiber-forming polymer but does not form a separate phase. A sufficient concentration of the partially miscible polymer may be introduced to the polymerization mixture of the fiber-forming polymer prior to polymerization or, alternatively, it may be mixed with the polymerized product. This can be accomplished by melt-blending or by coating the fiber-forming polymer flake with a sufficient concentration, such that upon melting a saturated polymer melt is produced. The usual care in avoiding degradation and introduction of impurities should be employed during this preparation.

Dispersion of the partially miscible polymer in the saturated fiber-forming polymer may be carried out in any suitable manner. Flake of the saturated polymer may be fed through a screw melter equipped with an injection port for introducing the additional, molten, partially miscible polymer; or the saturated polymer and the partially misicble polymer, both already in a molten state, may be fed to a suitable polymer mixing unit where after mixing they are passed through a transfer line to the spinning positions.

EXAMPLE I

Dried poly(hexamethylene adipamide) flake having a relative viscosity of about 35 in an 8.4% by weight solution in 90% formic acid is fed to a screw extruder having intermeshed co-rotating twin screws operating at 180 r.p.m. The extruder is equipped with heating means for melting the flake and the polymer is maintained in a molten condition while it is kneaded continuously and passed through the extruder. The extruder barrel is equipped with an inlet port at a point upstream of the exit through which is injected a poly(ethylene ether) alcohol end-capped with nonylphenol and having a molecular weight of about 1600 which has been heated to approximately the temperature of the molten polyamide. The feed rates of the polyamide and the polyether are regulated such that 2.4% of the polyether is injected based upon the weight of the final mixture. The polyether becomes dispersed throughout the polyamide by the kneading action of the extruder. The mixture is then fed from the extruder into a transfer line which carries it to a conventional melt-spinning meter pump for delivery at the desired rate and pressure to four sipnning positions. From the meter pump the polymer is centrally fed into a manifold line with four ports, each leading to a conventional spinneret pack assembly where the still molten polymer is spun into filaments (see figure). The ports (b and c) feeding the two inner spinning positions are located approximately equidistant from the central feeding point as are the two outer ports (a and d). Temperatures in the spinning assembly are maintained in a conventional manner to provide good spinning performance in accord with common melt-spinning practice. Analysis of the flaments from each position shows a difference in polyether concentration between the two innermost positions (see figure, b and c) and the outermost positions (a and d) of 0.28 weight percent.

The experiment is repeated except that poly(hexamethylene adipamide) flake is used which has been polymerized in the presence of 0.84% by weight of the above polyether. The polyether is added in aqueous solution during the conventional autoclave polymerization, as described for example in U.S. 2,163,636 to Spanagel. The polymerization proceeds normally. The polymer is extruded, quenched and cut into flake for use as described above. (By previous experiment it was determined that the solubility or limit of miscibility of the polyether in the molten polyamide is about 0.8 to 0.9 weight percent.) The thus saturated polyamide is melt-spun into filaments as before, except that the amount of polyether injected in the screw-extruder is adjusted to compensate for the amount already present in the polyamide to give a total polyether content of 2.4%. This time the concentration difference in polyether content between the inner and outer spinning positions is found to be less than 0.07%.

The experiment is again repeated using the same polyamide containing 0.84% of the polyether but additional polyether is injected to give a final total concentration of 3.7%. The concentration difference between positions, with this increased content, is found to be only 0.10%.

One skilled in the art will be aware of various types of polymer mixers and extruders which are suitable for this process. Suitable extruders are those equipped with inlet means for introducing the partially miscible polymer and which provide adequate mixing or kneading action to effectively disperse the injected polymer in the fiber-forming polymer. Particularly suitable are extruders having two intermeshing screws for example as described in British 687,021 and British 755,069. The extruders may also be equipped with regulated pressure zones for regulating the molecular weight of the fiber-forming polymer as described for example in British 998,063.

The process of this invention is applicable to any melt-spinnable, synthetic, linear, fiber-forming polymer into which is injected and dispersed, so as to form a separate phase before being spun into filaments, a partially miscible, inert polymer which does not react therewith and does not decompose at the melt-spinning conditions. Suitable melt-spinnable fiber-forming polymers are the polycarbonamides, polyesters and polyolefins. Typical of the partially miscible polymers which can be dispersed in such systems are the poly(alkylene ethers) and poly(styrene). Also the dispersed polymer may itself be fiber-forming and may even be of the same class as the polymer into which it is being dispersed provided that it is of a sufficiently different chemical composition that it is not completely miscible therewith.

Filaments spun from such dispersed polymer systems have modified properties. The modifications can include improvements in antistatic performance, surface luster, and physical properties such as increased modulus or elasticity. This invention results in improved effectiveness of the dispersing process in the continuous melt-spinning of such filaments.

What is claimed:
1. An improvement in the process of dispersing a partially miscible, substantially inert, molten poly(ethylene ether) polymer in a molten, synthetic, linear, fiber-forming polyamide polymer and spinning the polymer mixture into filaments in a continuous melt-spinning operation, said improvement comprising: substantially saturating the said fiber-forming polyamide polymer with the said partially miscible poly(ethylene ether) polymer; feeding the substantially saturated polymer to an apparatus for melt spinning the polymer; and injecting an additional amount of said partially miscible poly(ethylene ether) polymer in said saturated polymer prior to melt spinning, substantially all of said additional amount being dispersed in the fiber-forming polyamide polymer as a separate phase.

2. Claim 1 wherein said saturating of the said fiber-forming polyamide polymer is accomplished by coating flakes of the said fiber-forming polyamide polymer with the said partially miscible poly(ethylene ether) polymer followed by melting the said fiber-forming polyamide polymer and said partially miscible poly(ethylene ether) polymer.

3. Claim 1 wherein said saturating of the fiber-forming polyamide polymer is accomplished by mixing the said partially miscible poly(ethylene ether) polymer with the polymerization mixture of the said fiber-forming polyamide polymer prior to polymerization of the said fiber-forming polyamide polymer.

4. Claim 1 wherein said saturating of the fiber-forming polyamide polymer is accomplished by melt-blending the said partially miscible poly(ethylene ether) polymer with the said fiber-forming polyamide polymer.

5. Claim 1 wherein said poly(ethylene ether) is endcapped with nonylphenol and has a molecular weight of about 1600.

6. Claim 1 wherein said polyamide is poly(hexamethylene adipamide).

References Cited

UNITED STATES PATENTS

| | | | |
|---|---|---|---|
| 2,815,532 | 12/1952 | Braunlich | 264—171 |
| 2,929,731 | 3/1960 | Vries | 106—165 |
| 3,099,067 | 7/1963 | Merriam et al. | 264—317 X |
| 2,700,657 | 1/1955 | Look et al. | |
| 2,996,474 | 8/1961 | Voigt. | |
| 3,097,991 | 7/1963 | Miller et al. | |
| 3,234,313 | 2/1966 | Miller et al. | |
| 3,369,057 | 2/1968 | Twilley. | |
| 3,381,057 | 4/1968 | Senoo et al. | 28—72 X |
| 3,382,305 | 5/1968 | Breen | 264—171 |

FOREIGN PATENTS

| | | |
|---|---|---|
| 970,285 | 9/1964 | Great Britain. |
| 673,668 | 11/1963 | Canada. |
| 38/16,030 | 8/1963 | Japan. |
| 40/13,670 | 7/1965 | Japan. |

JULIUS FROME, Primary Examiner

J. H. WOO, Assistant Examiner

U.S. Cl. X.R.

264—349, 171